Feb. 11, 1936.  H. KÜPPENBENDER ET AL  2,030,643
COMBINED OBJECTIVE AND EXPOSURE METER FOR PHOTOGRAPHIC
OR CINEMATOGRAPHIC EXPOSING APPARATUS
Filed June 12, 1934   3 Sheets-Sheet 1

Inventors
H. Küppenbender
M. Nowicki
By: Hans Hederich
Attorney

Feb. 11, 1936.  H. KÜPPENBENDER ET AL  2,030,643
COMBINED OBJECTIVE AND EXPOSURE METER FOR PHOTOGRAPHIC
OR CINEMATOGRAPHIC EXPOSING APPARATUS
Filed June 12, 1934  3 Sheets-Sheet 2

INVENTORS

Feb. 11, 1936.  H. KÜPPENBENDER ET AL  2,030,643
COMBINED OBJECTIVE AND EXPOSURE METER FOR PHOTOGRAPHIC
OR CINEMATOGRAPHIC EXPOSING APPARATUS
Filed June 12, 1934    3 Sheets-Sheet 3
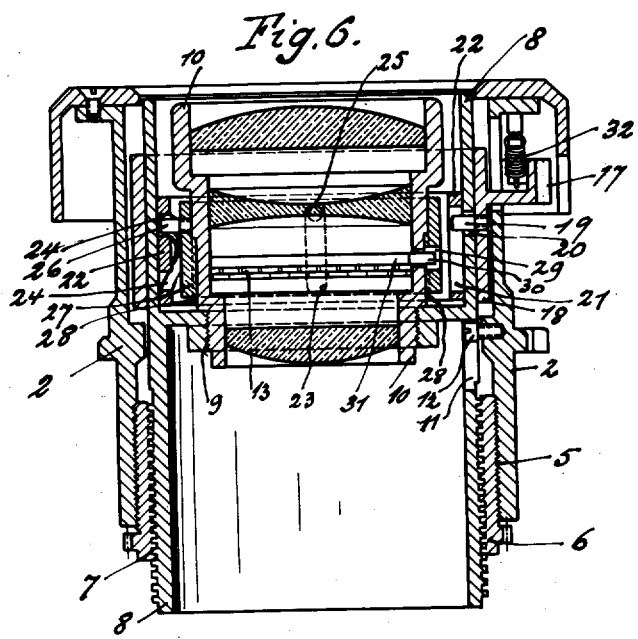
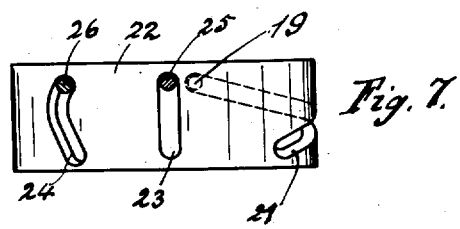
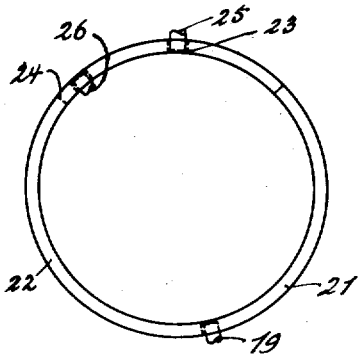
INVENTORS Patented Feb. 11, 1936

2,030,643

UNITED STATES PATENT OFFICE 2,030,643

COMBINED OBJECTIVE AND EXPOSURE METER FOR PHOTOGRAPHIC OR CINEMATOGRAPHIC EXPOSING APPARATUS

Heinz Küppenbender and Martin Nowicki, Dresden, Germany, assignors to Zeiss Ikon Aktiengesellschaft Dresden, Dresden, Germany Application June 12, 1934, Serial No. 730,200
In Germany June 17, 1933

4 Claims. (Cl. 95—64)

This invention relates to a photographic or cinematographic camera, the objective diaphragm of which is automatically adjusted in correspondence with the ascertained time of exposure when an exposure meter combined with the camera is actuated. Such a combination or coupling of an objective diaphragm and an exposure meter cannot be effected at liberty; it is indispensably requisite to provide between said parts a certain combination and arrangement of members rendering possible for the driving mechanism of the diaphragm a movement corresponding to the position of the exposure meter, that is to say, simultaneously with the ascertainment of the proper exposing time the diaphragm aperture must be automatically adjusted whereby the correct screening of the object to be photographed at the respective exposing time is obtained. For this purpose a member having a curved compensation slot or an equivalent therefor is provided between the exposure meter and the objective diaphragm. The respective member is firmly located in the objective carrier and is exchanged together with the objective when exchange of the same should become necessary.

The invention is illustrated diagrammatically and by way of example on the accompanying drawings on which Figure 1 is an axial section in the plane A—B of Fig. 2. Figure 2 is a front-view of the objective carrier with the objective (left-hand half of Fig. 1) and of the exposure meter (right-hand half of Fig. 1), and Figure 3 is a side-view of an annular member with three slots, of which one is the above-mentioned compensation slot and the other two are guide slots, all as fully described hereinafter.

Fig. 6 is an axial section through an objective carrier of modified construction.

Fig. 7 is a side view of an annular slotted member for the objective carrier illustrated in Fig. 6.

Fig. 8 is a top plan view of Fig. 8.

Figure 1:
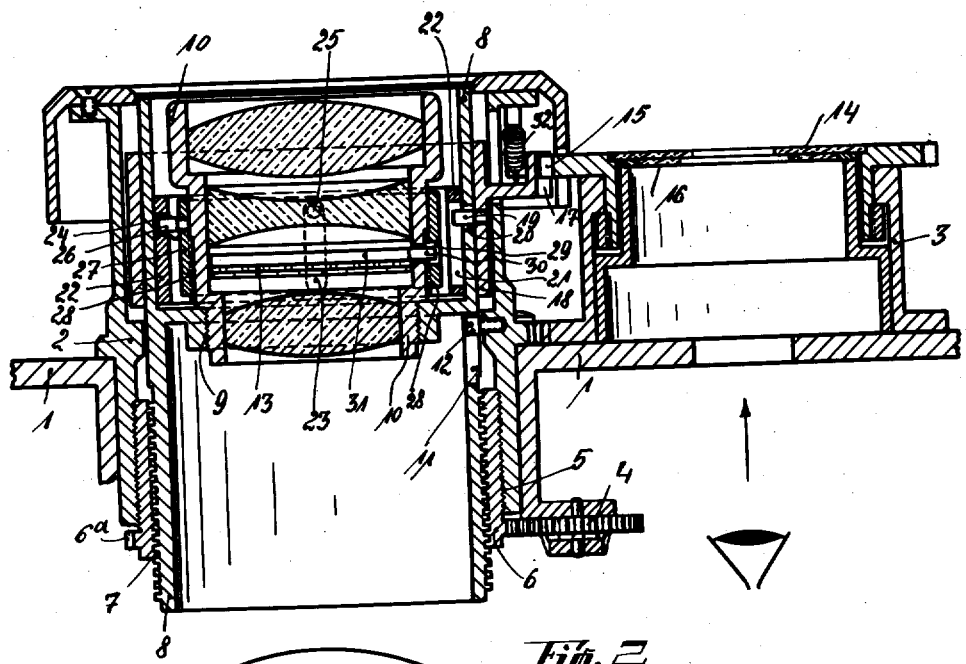
Figure 2:
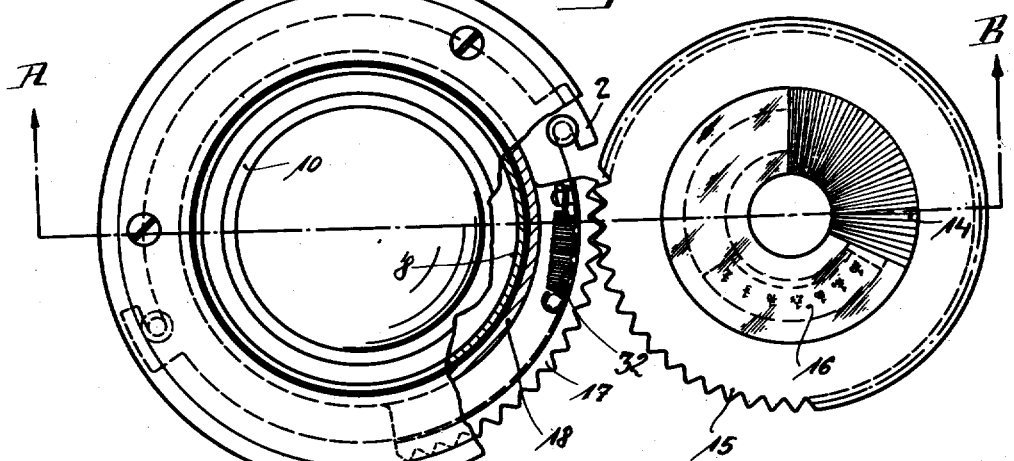

The exposure meter used in the constructional form shown in the drawings is provided with a grey-wedge, but we wish it to be understood that also other suitable types of exposure meters may be used.

On the drawings, 1 (Figs. 1, 2, 5 and 6) denotes the camera wall, 2 is the objective carrier, and 3 the exposure meter which devices are attached to said wall. The objective carrier 2 may be detachably attached to the wall 1 by means of a bayonet closure.

In the example shown the objective is a so-called helical mount objective which can be axially shifted for sharp adjustment by means of a cog-wheel 4 that meshes with a circumferential toothing 6ª forming part of a sleeve 6. The wheel 4 can be turned by means of a grip (not shown). The tubular objective carrier 2 has at its inner end a fine thread and the sleeve 6 has a corresponding thread with which it is screwed into the objective carrier 2. The inner circumferential surface of the sleeve 6 is provided with a multiple worm-thread 7 into which is screwed the correspondingly threaded tubular member 8 which has about in its middle an internal flange 9 with a fine thread into which the lens carrier 10 is screwed.

Near said flange 9 the tubular member 8 is provided with a longitudinal slot 11 which is engaged by a guide pin 12 projecting inwardly from the objective carrier 2. When the cog-wheel 4 is turned, also the sleeve 6 will be turned, and as the tubular member 8 is prevented from taking part in the rotary motion (owing to the pin 12 engaging the slot 11 of said member), this latter will be axially moved, as will also the lens carrier 10 whereby the sharp-adjustment of the lenses is effected.

Figure 3:
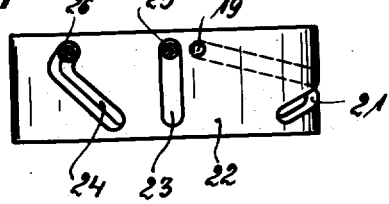
Figure 4:
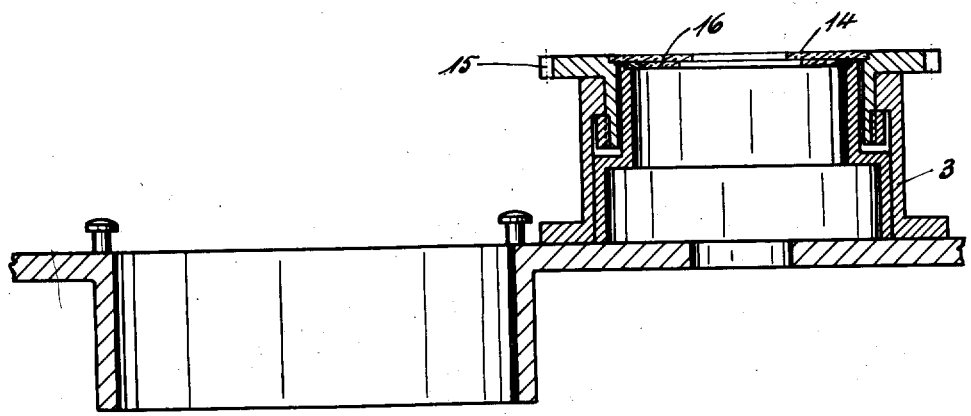
Fig. 4 shows the exposure meter removed from the objective carrier.
Figure 5:
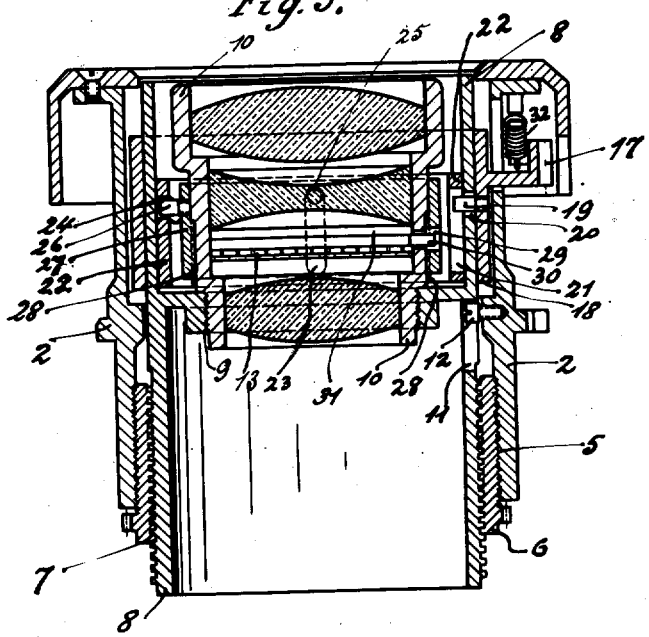
Fig. 5 shows the objective carrier with the exposure meter removed.

As to the grey-wedge exposure meter we refrain from describing how this meter is manipulated, as this is generally known to experts. 14 is the grey-wedge which is secured to a cog-wheel 15; by turning this wheel the grey-wedge 14 is moved past a properly graduated exposure scale 16. The cog-wheel 15 meshes with a circumferential toothing 17 forming part of a sleeve 18 that encompasses the tubular member 8. From the sleeve 18 projects inwardly a pin 19 which extends through a slot 20 provided in the tubular member 8 and extending at right angles to the axis of the objective. The pin 19 extends through said slot 20 into a curved slot 21 (Figs. 3, 7 and 8) provided in a ring 22 located inside the tubular member 8 and having, besides said slot 21, an axial slot 23 for guiding the ring axially, and an oblique angular slot 24 which constitutes the above-mentioned compensation slot. The slot 23 is engaged by a pin 25 projecting inwardly from the tubular member 8 (as shown in dotted lines in the middle portion of Figs. 1, 5 and 6).

When the cog-wheel 15 (pertaining to the exposure meter) is turned, also the sleeve 18 with the pin 19 will be turned, and owing to the existance of the curved slot 21 and the axially directed straight slot 23 with the appertaining pin 25 the ring 22 will be axially shifted, as will be, of course, also the angular slot 24 of this ring. The pin 26 which engages said angular slot projects outwardly from the diaphragm ring 27 having a very fine thread 28 with very small friction with which it is screwed upon the lens carrier 10. In said ring 27 is a bore 29 engaged by a pin 30 projecting outwardly from a ring 31 by which the lamellæ of the Iris diaphragm 13 are moved. The shapes and sizes of the slots 21 and 24 are such that after the proper exposing time for an object to be photographed has been ascertained by suitable turning of the grey-wedge 14, or of the cog-wheel 15 respectively, the Iris diaphragm is automatically so adjusted that during this exposing time an unobjectionable dimming of the respective object takes place.

The objective carrier 2 and the sleeve 18 are connected with one another (on the side where there is the exposure meter) by a helical tensile spring 32 (Figs. 1, 2, 5 and 6). When the sleeve 18 is moved into operative position this is effected counter to the action of said spring. When the objective carrier is being exchanged, the spring 32 draws back into their positions and resets all parts which are mechanically connected with the sleeve 18, in such a manner, that the objective diaphragm is finally completely open, so that when another objective is inserted this is likewise completely open. It is a matter of course that after an objective has been exchanged, also the grey wedge must be turned back into its original position which can be effected manually or automatically.

We claim:

1. An arrangement on photographic cameras and the like for automatically adjusting the diaphragm in correspondence with the adjustment of an exposure meter, comprising in combination a tubular member having a slot in its wall, a pin projecting from the inner side of said tubular member at a distance from said slot, a sleeve surrounding said tubular member and adapted to be rotated during the adjustment of the exposure meter, a pin projecting from the inner side of said sleeve through the slot in said tubular member, a ring axially shiftable in said tubular member having distributed around its circumference three slots, namely a straight axial slot, a curved slot and an angular slot, and a pin projecting from said tubular member engaging in said axial slot adapted to axially guide said ring and prevent rotation of the same, the end of this pin projecting from said sleeve engaging in said curved slot and adapted to axially shift said ring in said tubular member during the rotation of said sleeve, and a diaphragm adjusting ring in said slotted ring, a pin projecting from the outer side of said diaphragm ring and engaging in said angular slot and adapted to turn said diaphragm adjusting ring according to the shape of said angular slot during the axial displacement of said first mentioned ring.

2. In an arrangement as specified in claim 1 a lens holder carried by the tubular member and an objective carrier surrounding the outer sleeve and connected to said tubular member, said carrier forming with the parts contained therein a complete lens unit adapted to be removed from the camera and replaced by another lens unit.

3. An arrangement as specified in claim 1 in which the shape of the angular slot is adapted to the kind and focal length of the lens.

4. In an arrangement as specified in claim 1 a tension spring connected at one end to the tubular member and at its other end to the sleeve and tending to maintain said sleeve and said tubular member in their initial positions.

HEINZ KÜPPENBENDER.
MARTIN NOWICKI.